United States Patent
Kirner et al.

(10) Patent No.: US 11,381,603 B2
(45) Date of Patent: Jul. 5, 2022

(54) USER-BASED VISIBILITY AND CONTROL OF A SEGMENTATION POLICY

(71) Applicant: Illumio, Inc., Sunnyvale, CA (US)

(72) Inventors: Paul J. Kirner, Palo Alto, CA (US); Dhanalakshmi Balasubramaniam, Palo Alto, CA (US); Seth Bruce Ford, San Francisco, CA (US); Mukesh Gupta, Fremont, CA (US); Matthew K. Glenn, Mountain View, CA (US)

(73) Assignee: Illumio, Inc., Sunnyvale, CA (US)

( * ) Notice: Subject to any disclaimer, the term of this patent is extended or adjusted under 35 U.S.C. 154(b) by 52 days.

(21) Appl. No.: 16/848,769

(22) Filed: Apr. 14, 2020

(65) Prior Publication Data

US 2020/0389498 A1 Dec. 10, 2020

Related U.S. Application Data

(63) Continuation of application No. 15/873,896, filed on Jan. 18, 2018, now abandoned.

(51) Int. Cl.
| | |
|---|---|
| *H04L 9/40* | (2022.01) |
| *H04L 43/045* | (2022.01) |
| *H04L 41/22* | (2022.01) |
| *H04L 45/50* | (2022.01) |
| *G06F 16/901* | (2019.01) |
| *H04L 43/026* | (2022.01) |
| *H04L 43/028* | (2022.01) |

(52) U.S. Cl.
CPC .......... *H04L 63/20* (2013.01); *G06F 16/9024* (2019.01); *H04L 41/22* (2013.01); *H04L 43/026* (2013.01); *H04L 43/045* (2013.01); *H04L 45/50* (2013.01); *H04L 63/105* (2013.01); *H04L 43/028* (2013.01)

(58) Field of Classification Search
CPC ....... H04L 63/20; H04L 41/22; H04L 43/026; H04L 43/045; H04L 45/50; H04L 63/105; H04L 43/028; G06F 16/9024
See application file for complete search history.

(56) References Cited

U.S. PATENT DOCUMENTS

| | | | | |
|---|---|---|---|---|
| 9,485,279 | B2 ‡ | 11/2016 | Kirner | H04L 63/10 |
| 9,882,919 | B2 ‡ | 1/2018 | Kirner | H04L 63/1416 |
| 9,910,713 | B2 * | 3/2018 | Wisniewski | G06F 9/45558 |
| 2009/0235324 | A1 ‡ | 9/2009 | Griffin | G06F 21/53 |
| | | | | 726/1 |
| 2012/0030731 | A1 * | 2/2012 | Bhargava | G06F 21/566 |
| | | | | 726/3 |
| 2014/0053226 | A1 * | 2/2014 | Fadida | H04L 67/34 |
| | | | | 726/1 |

(Continued)

*Primary Examiner* — Trang T Doan
(74) *Attorney, Agent, or Firm* — Fenwick & West LLP

(57) ABSTRACT

A segmentation server enables user-based management of a segmentation policy. Administrators belonging to different user groups may have different limited visibility into traffic flows controlled by the segmentation policy and may be assigned different privileges with respect to viewing, creating, and modifying rules of the segmentation policy. Thus, the burden of administering the segmentation policy may be distributed between administrators associated with different user groups that each may have responsibility for a different segment.

20 Claims, 5 Drawing Sheets

(56) References Cited

U.S. PATENT DOCUMENTS

| | | | |
|---|---|---|---|
| 2014/0373091 A1* | 12/2014 | Kirner | H04L 41/0893 |
| | | | 726/1 |
| 2015/0127832 A1* | 5/2015 | Kirner | H04L 63/06 |
| | | | 709/225 |
| 2016/0277308 A1‡ | 9/2016 | Challa | H04L 67/42 |
| 2016/0301717 A1* | 10/2016 | Dotan | G06F 40/186 |
| 2016/0359872 A1‡ | 12/2016 | Yadav | H04L 43/04 |
| 2017/0293534 A1‡ | 10/2017 | Auvenshine | G06F 11/1464 |
| 2017/0364698 A1‡ | 12/2017 | Goldfarb | G06F 21/6218 |
| 2017/0374101 A1‡ | 12/2017 | Woolward | H04L 63/20 |
| 2018/0176185 A1* | 6/2018 | Kumar | H04L 63/0236 |
| 2018/0176261 A1* | 6/2018 | Bansal | H04L 63/205 |
| 2018/0234459 A1* | 8/2018 | Kung | H04L 63/0263 |
| 2019/0065278 A1‡ | 2/2019 | Jeuk | G06F 9/5077 |
| 2019/0158541 A1‡ | 5/2019 | Miriyala | H04L 63/205 |
| 2019/0220298 A1‡ | 7/2019 | Jiao | G06F 9/45558 |

\* cited by examiner
‡ imported from a related application

USER-BASED VISIBILITY AND CONTROL OF A SEGMENTATION POLICY

CROSS REFERENCE TO RELATED APPLICATIONS

This application is a continuation of co-pending U.S. application Ser. No. 15/873,896, filed Jan. 18, 2018, which is incorporated by reference in its entirety.

BACKGROUND

Technical Field

This application is a continuation of now abandoned U.S. application Ser. No. 15/873,896, filed Jan. 18, 2018, which is incorporated by reference in its entirety.

Description of Related Art

A segmentation policy comprises a set of rules that control which workloads may communicate on a network and may place restrictions on how such workloads may communicate. Conventionally, a system administrator may manually configure the segmentation policy by defining individual rules. For a complex network with a large number of workloads, manually configuring the segmentation policy may be a highly burdensome task. As a result, an enterprise may need to devote significant resources to administrating the segmentation policy. Furthermore, an enterprise may face increased security risks if the segmentation policy is not carefully configured.

SUMMARY

A system, non-transitory computer-readable storage medium, and method facilitate creation of a segmentation policy that controls communications between a plurality of workloads. A segmentation servers identifies a user group that is associated with one or more administrators logged into a client accessing a segmentation server. The segmentation server identifies one or more label sets associated with the user group from a user group database. The segmentation server identifies a subset of workloads of the plurality of workloads from a workload database that have at least one of the group of label sets associated with the identified user group. The segmentation server generates a set of rules for controlling communications associated with the subset of workloads. Management instructions are generated for enforcing the set of rules. The management instructions are sent to respective operating system instances executing the subset of workloads. The respective operating system instances may enforce the set of rules based on the management instructions.

In an embodiment, the segmentation server monitors traffic flows between the subset of workloads and generates a traffic flow graph based on the monitored traffic flows. The traffic flow graph comprises a plurality of nodes representing the subset of workloads and a plurality of edges representing the monitored traffic flows between the subset of workloads. A graphical representation of the traffic flow graph is generated. The graphical representation of the traffic flow graph is outputted to the administrative client.

The rules may be generated according to different segmentation strategies selectable via the administrative client. In a first configuration (e.g., a low granularity segmentation strategy), rules are generated that permit communication between workloads sharing a particular predefined label set (e.g., workloads within an application group). In other configurations, the segmentation server may monitor traffic flows associated with the subset of workloads and generate the set of rules based on the monitored traffic flows so that the rules permit the monitored traffic flows. For example, in a second configuration, (e.g., a moderate granularity segmentation strategy), a detected traffic flow between a first workload and a second workload is detected. The segmentation server determines a first label set is corresponding to the first workload and a second label set corresponding to the second workload. A rule is then generated permitting communications between workloads having the first label set and workloads having the second label set. In a third configuration, (e.g., a high granularity segmentation strategy), one or more ports and one or more protocols associated with a detected traffic flow between a first workload and a second workload are each determined. Furthermore, a label set associated with the first workload and second label set associated with the second workload are determined. A rule is then generated permitting communications using the one or more ports and the one or more protocols between workloads having the first label set and workloads having the second label set.

In an embodiment, rules may be generated differently depending on privileges associated with the user group. For example, the segmentation server may determine that the user group has limited ruleset creation privileges. Here, the segmentation server generates the rule set to only include rules permitting communications between pairs workloads in the subset of workloads that both have at least one of the group of label sets associated with the user group. In another case, the segmentation server may determine that the user group has expanded ruleset creation privileges. In this case, the segmentation server generates the rule set to also include rules permitting communications in which a workload in the subset of workloads having at least one of the group of label sets associated with the user group provides a service to a workload outside the subset of workloads.

In one embodiment, the generated rules are stored to a rules database prior to generating the management instructions. The segmentation server identifies access by a provisioner associated with a provisioner user group, which may be different from a rule creator or other roles. A user interface is presented for providing the rules for review by the provisioner. The management instructions are then generated response to receiving confirmation from the provisioner to implement the rules.

DETAILED DESCRIPTION

The Figures (FIGS.) and the following description describe certain embodiments by way of illustration only.

One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

A segmentation server enables role-based visibility and management of a segmentation policy. Administrators belonging to different user groups associated with different roles may have different limited visibility into traffic flows controlled by the segmentation policy and may be assigned different privileges with respect to viewing, creating, modifying, and provisioning rules of the segmentation policy. Thus, the burden of administering the segmentation policy may be distributed between administrators associated with different user groups that each may have responsibility for a different segment of an administrative domain. The division of responsibility beneficially enables an enterprise to ease the administrative burden of managing the global segmentation policy for any single individual. Furthermore, exposure associated with a security breach of an administrator account can be contained to a particular segment, thereby improving overall security.

Figure 1:
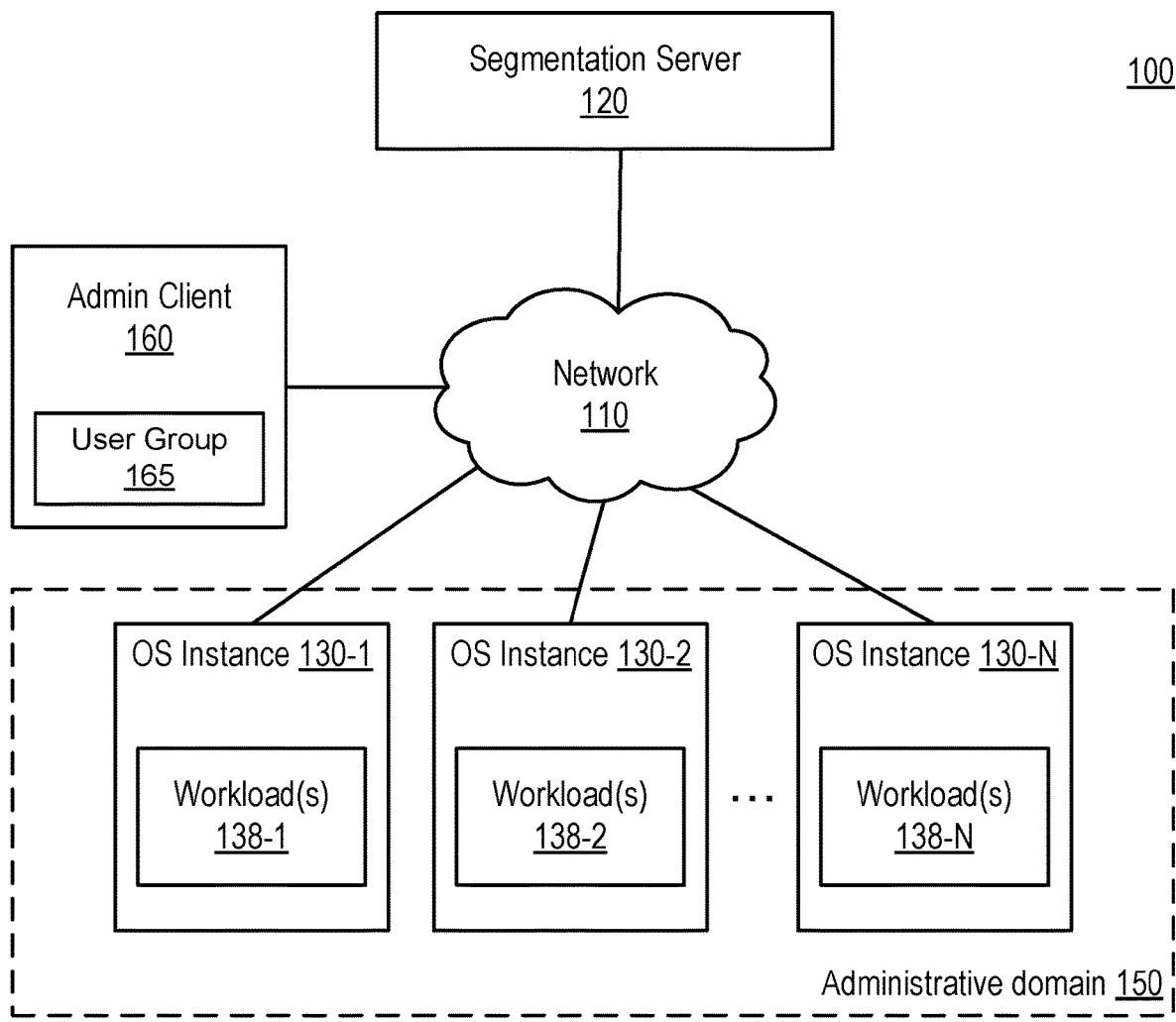
FIG. 1 is a high-level block diagram illustrating an environment for managing a segmentation policy, according to one embodiment.

FIG. 1 is a high-level block diagram illustrating a networked computing environment 100. The networked computing environment 100 includes a segmentation server 120, a network 110, an administrative client 160, and an administrative domain 150 that includes a plurality of operating system (OS) instances 130 (e.g., OS instances 130-1, 130-2, . . . , 130-N). The administrative domain 150 can correspond to an enterprise such as, for example, a service provider, a corporation, a university, or a government agency under control of the segmentation server 120.

The network 110 represents the communication pathways between the segmentation server 120, the administrative client 160, and the OS instances 130. In one embodiment, the network 110 uses standard communications technologies and/or protocols and can include the Internet. In another embodiment, the entities on the network 110 can use custom and/or dedicated data communications technologies.

The OS instances 130 comprise instances of an operating system executing on one or more computing devices. An OS instance 130 may execute directly on a physical machine or on a virtual machine that executes on one or more computing devices. A single physical or virtual machine may operate a single OS instance 130 or may operate multiple OS instances 130. The OS instances 130 each execute one or more workloads 138 (e.g., one or more workloads 138-1, one or more workloads 138-2, etc.). The workloads 138 comprise independently addressable computing units for performing computing tasks. A workload 138 may comprise, for example, an application or application component, a process, a container, or other sub-component thereof executing on the OS instance 130. In some instances, an OS instance 130 may operate only a single workload 138. In other instances, an OS instance 130 may operate multiple workloads 138 that may be independently addressable and may perform different independent computing functions. The workloads 138 on the OS instances 130 may communicate with other workloads 138 on different OS instances 130 within the administrative domain 150 to perform various tasks.

The segmentation server 120 is a computer (or set of computers) that obtains and stores information about the OS instances 130 on the network 120 and the workloads 138 executing on the OS instances 130. The segmentation server 120 manages a segmentation policy for the administrative domain 150 that regulates communications between workloads 138 within the administrative domain 150. In an embodiment, the segmentation policy is set forth using permissive rules that specify the communications that are permitted. The segmentation policy is enforced by blocking any communications that are not expressly permitted by the rules. For example, the segmentation policy includes a set of rules specifying whether certain workloads 138 are allowed to provide services to or receive services from other workloads 138, and may place restrictions on how those workloads 138 are allowed to communicate when providing or consuming the services. For example, a segmentation policy may include a rule specifying that a workload 138-1 operating on an OS instance 130-1 is allowed to provide a particular service to a workload 138-2 operating on an OS instance 130-2. Absent other rules, the workload 138-1 will thus be blocked from providing the service to a workload 138-N operating on an OS instance 130-N. The rule may furthermore specify the type of service that the workload 138-1 is allowed to provide to workload 138-2 (e.g., a database service, a web service, etc.). Additionally, the rule may specify how the workloads 138-1, 138-2 may communicate when providing this service (e.g., using encrypted communication only, using authenticated communication only, etc.). A rule may be specified as a plurality of fields including a "service," a "provided-by" portion that identifies one or more workloads 138 that is permitted to provide the service, a "used-by" portion that identifies one or more workloads 138 that is permitted to use the service provided by the workloads 138 in the "provided-by portion," and a "rule function" that may place one or more restrictions on the communications between the workloads 138 while facilitating the service.

In an embodiment, the segmentation server 120 may assign one or more labels to each workload 138 that define one or more high-level characteristics of the workload 138. Labels may be defined for multiple different dimensions. Here, each label may comprise a "dimension" (a high-level characteristic) and a "value" (the value of that high-level characteristic). For example, one possible label dimension may specify a "role" of the workload 138 and may have values such as "web," "API," or "database" specifying the role of the workload 138 within the administrative domain 150. In another example, a label dimension may specify a "location" of the workload 138 and may have values such as "United States" or "Europe." Workloads 138 may also be labeled based on a user group of a user that is logged into the workload 138 or the corresponding OS instance 130 on which the workload 138 executes. For example, a workload 138 may have a label with a dimension "user group" and a value "managers." Each workload 138 may be assigned labels for one or more dimensions but each workload 138 does not necessarily have a label assigned for every possible dimension. For example, a workload 138 may have a label specifying its location but may not necessarily have a label specifying its role.

A logical management model specifying the number and types of dimensions available and those dimensions' possible values may be configurable. In one embodiment, the logical management model includes the following dimensions and possible values, as shown in Table 1:

TABLE 1

Example of logical management model

| Dimension | Meaning (M), Values (V) |
|---|---|
| Role | M: The role of the managed server within the administrative domain. V: web, API, database |
| Environment | M: The lifecycle stage of the managed server. V: production, staging, development |
| Application | M: The logical application (higher-level grouping of managed servers) to which the managed server belongs. V: trading, human resources |
| Line of Business | M: The business unit to which the managed server belongs. V: marketing, engineering |
| Location | M: The location of the managed server. Can be physical (e.g., country or geographical region) or logical (e.g., network). Physical is particularly useful for expressing geographic compliance requirements. V: US or EU (physical), us-west-1 or us-east-2 (logical) |
| User Group | M: The user group containing the user logged onto the managed server. V: Engineers, Contractors, Managers, System Administrators |

Labels may be logically grouped into label sets. Here, a label set comprises a set of one or more labels. A label set may include only a single label dimension and value (e.g., Role: Database) or may include multiple label dimensions and corresponding values (e.g., Role: Database; Location: New York). The segmentation server 120 may utilize label sets to enable the segmentation policy to be defined at a high level of abstraction by specifying rules based on label sets instead of by identifying individual workloads 138. Thus, a rule of the segmentation policy may identify a group of workloads 138 to which a portion of the rule is applicable by referencing one or more label sets. For example, a rule may specify that workloads 138 with a label set A may provide a service B to workloads 138 with a label set C. Here, a rule that specifies a label set A that specifies label values in fewer than all of the available dimensions is applied to any workloads 138 that have all of the labels in the label set A (i.e., are within the "scope" of the label set A), regardless of the workloads' labels in other dimensions not part of the label set A. Thus, for example, a rule that references a label set "Role: Database; Location: New York" is applicable to all workloads having both of the labels "Role: Database" and "Location: New York," regardless of their labels in other dimensions.

In an embodiment, special groups of workloads 138 may be defined as a group of workloads 138 having the same label set with respect to a predefined group of label dimensions. For example, an "application group" may be defined as a group of workloads 138 having the same label values for the "environment" and "application" dimensions without necessarily having the same values in the other dimensions. Alternatively, an "application group" may defined as a group of workloads 138 having the same label values for the "environment," "application" and "location" dimensions without necessarily having the same values in the other dimensions. In another example, a "tier" may be defined as a group of workloads 138 having the same label values for the "environment," "application," and "role" labels without necessarily having the same values in the other dimensions. Alternatively, a "tier" may be defined as a group of workloads 138 having the same label values for the "environment," "application," "role," and "location" dimensions without necessarily have the same values in the other dimensions. Rules may be specified that control communications between application groups or between tiers based on the definitions above.

The segmentation server 120 may retain a repository storing information about the OS instances 130 and the workloads 138 managed by the segmentation server 120. For example, the segmentation server 120 may store, for each OS instance 130, an OS instance identifier that uniquely identifies the OS instance 130, workload identifiers for workloads 138 associated with the OS instance 138, and membership information indicating one or more groups of workloads 138 to which each workload 138 belong (e.g., as defined by the respective label sets for the workloads 138).

Table 2 illustrates an example of information stored by the segmentation server 120. Here, the "ID" represents the OS instance identifier for each OS instance 130. The workload ID(s) represent the workload identifier for the workload(s) 138 executing on each OS instance 130. If only a single workload executes on a particular OS instance 130, the workload ID may be synonymous with the OS instance ID (e.g., in the case of ID1 and IDn). If more than one workload 138 executes on a given OS instance 130, the workload ID may include the OS instance ID in combination with a sub-identifier for the workload 138 (e.g., in the case of ID2). The sub-identifier may comprise, for example, a port number, IP address, process name, or other identifier that uniquely identifies the workload 138 when taken in combination with the identifier for the OS instance 130. The memberships represent groups to which one or more workloads 138 executing on the OS instance 130 belongs. Each group may correspond to a unique label set (e.g., a different combination of labels) involving one or more dimensions. For example, group A may represent a group of workloads 138 having the label set (Role: Web; Location: Europe).

TABLE 2

Example of a Repository Table

| OS Instance ID | Workload ID(s) | Memberships |
|---|---|---|
| ID1 | ID1 | A, C, D |
| ID2 | ID2 + subID1 | B, C |
|  | ID2 + subID2 | D |
| . | . | . |
| . | . | . |
| . | . | . |
| IDn | IDn | B, D, E, F |

Instead of enforcing the segmentation policy at a centralized device, the segmentation policy is instead enforced by at least a subset of the OS instances 130. To enable enforcement of the segmentation policy, the segmentation server 120 generates a set of management instructions and distributes the management instructions to the OS instances 130. The management instructions include the rules controlling communications between different groups of workloads 138 (e.g., specified by their label sets or directly by an identifier of the workload 138) and membership information indicating workloads 138 belonging to each group (e.g., which workloads 138 have certain label sets). For efficiency of distribution, the segmentation server 120 may send different management instructions to different OS instances 130 so that each OS instance 130 gets only the management instructions relevant to its operation. Here, the segmentation server 120 may determine which rules are relevant to a given OS instance 130 and distribute the relevant rules to that OS instance 130. A rule may be deemed relevant to a particular OS instance 130 if that OS instance 130 executes one or more workloads 138 that belongs to a group (defined by one or more label sets) referenced by the rule. The segmentation server 120 may furthermore determine which membership information is relevant to each OS instance 130 and distribute the relevant membership information to each respective OS instance 130. Here, membership information may be relevant to a particular OS instance 130 if it defines membership of a group referenced by a rule deemed relevant to the particular OS instance 130. Further details of a segmentation system for controlling communications between OS instances 130 based on labels is described in U.S. Patent Application Publication No. 2014/0373091 entitled "Distributed Network Security Using a Logical Multi-Dimensional Label-Based Policy Model," to Paul J. Kirner, et al., which is incorporated by reference herein.

The administrative client 160 comprises a computing device that may be operated by an administrator of the administrative domain 150 being managed by the segmentation server 120. The administrative client 160 may execute an interface (e.g., via an application or web browser) that enables the administrator to interact with the segmentation server 120 to configure or view the segmentation policy. The interface may furthermore enable the administrator to obtain various information about the OS instances 130 and workloads 138 on the network 120 and view traffic flows between the workloads 138.

A particular administrator may log into a client 160 using credentials that uniquely identify the administrator and may be used to identify a user group 165 to which the administrator is a member. User groups may have multiple members or may have only a single member. Furthermore, an administrator may be a member of multiple user groups. Administrators that are members of different user groups 165 may have different privileges and access to different information associated with administering the segmentation policy. Particularly, different user groups 165 may be associated with one or more label sets. A member of a particular user group 165 may be limited to viewing, generating, or modifying rules within the scope of the label set for the user group. The member of the user group 165 may be unable to access or control rules associated with label sets outside the scope of those associated with to the user group 165. In this way, administration of the segmentation policy may be divided between user groups 165 that control respective subsets of the rules relating to different label sets. For example, administration of the segmentation policy may be divided between different user groups 165 based on the different label dimensions such as location, business line, role, environment, application, or different combinations of label dimensions.

A benefit to enabling user-based administration of the segmentation policy is that it significantly eases the administrative burden of managing the segmentation policy a large network. For example, multiple administrators can operate in parallel to generate or modify the segmentation policy without the actions of one administrator necessarily affecting the actions of others. Furthermore, by assigning different user groups to administer different portions of the segmentation policy, different administrators may become more specialized in the particular security needs associated with specific applications or their portion of the network and may therefore be able to better cater the segmentation policy to those needs. Further still, limiting the access of administrators to only a limited portion of the segmentation policy makes it more difficult for an administrator to create a vulnerability in the segmentation policy (e.g., by mistake or by intentional malicious action). Examples of techniques for enforcing user-based control of a segmentation policy are described in further detail below.

Figure 2:
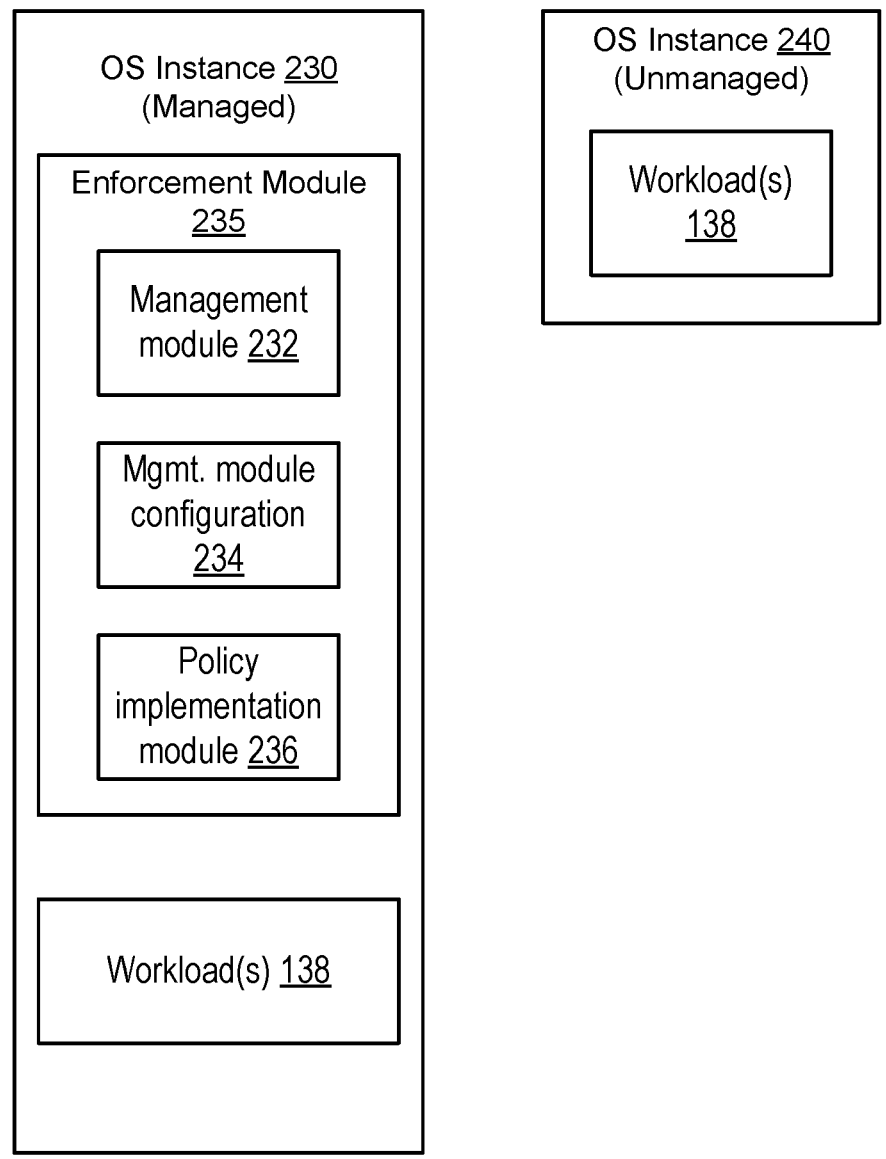
FIG. 2 is a block diagram illustrating example embodiments of operating system instances.

FIG. 2 illustrates example embodiments of OS instances 130. An OS instance 130 may correspond to a managed OS instance 230 or an unmanaged OS instance 240. A managed OS instance 230 includes an enforcement modules 235 that enables the managed OS instance 230 to enforce the segmentation policy for the workloads 138 it executes. In contrast, the unmanaged OS instance 235 does not include an enforcement module 235 and is unable to directly contribute to enforcement of the segmentation policy. The segmentation server 120 thus only distributes management instructions to the managed OS instances 230. Nevertheless, the unmanaged OS instances 240 may still be affected by the segmentation policy because the managed OS instances 230 may limit communications between workloads 138 on the managed OS instances 130 and workloads 138 on the unmanaged OS instance 240. Workloads 138 executing on the unmanaged OS instances 240 may be assigned labels and may be referenced in the rules of the segmentation policy in the same way as workloads 138 on managed OS instances 130. Thus, communications between workloads 138 on managed OS instances 230 and unmanaged OS instances 240 may be controlled by the segmentation policy by enforcing the rules at the managed OS instances 230.

In some embodiments, the segmentation policy may be effectively enforced on an unmanaged OS instance 240 by a separate device that can control communication to and from the unmanaged OS instance 240 on which workloads 138 execute. For example, an enforcement module 235 on an upstream switch port, or other physical or logical device may control communications to and from workloads 138 on a downstream unmanaged OS instance 240. In this case, the segmentation policy can be enforced directly on the workloads 138 on an unmanaged OS instance 240 similarly to enforcement on a managed OS instance 230.

The enforcement module 235 includes a management module 232, a management module configuration 234, and a policy implementation module 236. The management module 232 comprises a low-level network or security engine that controls incoming and outgoing traffic associated with each of the workloads 138 executing on the OS instance 130. For example, the management module 232 may include an operating system-level firewall, an Internet Protocol security (IPsec) engine, or a network traffic filtering engine (e.g., based on the Windows Filtering Platform (WFP) development platform). The management module 132 on a given managed OS instance 230 restricts communications to or from the workloads 138 executing on the given managed OS instances 230 based on the management module configuration 134. For example, the management module 232 may permit a particular workload 138 to communicate with a limited set of workloads 138 on other OS instances 130, and may block all other communications. Furthermore, the management module 232 may place restrictions on how each workload 138 is permitted to communicate. For example, for a particular workload 138, the management module 232 may enable the workload 138 to communicate using only encrypted protocols and block any unencrypted communications.

The policy implementation module 236 receives the management instructions from the segmentation server 120 and translates the management instructions from a high level of abstraction to a low level of abstraction represented by the management module configuration 234. For example, the policy implementation module 236 may obtain the relevant rules and relevant membership information from the management instructions, and identify the specific workloads 138 and services controlled by the rules. The policy implementation module 236 then generates a management module configuration 234 that enables the management module 232 to enforce the management instructions.

Figure 3:
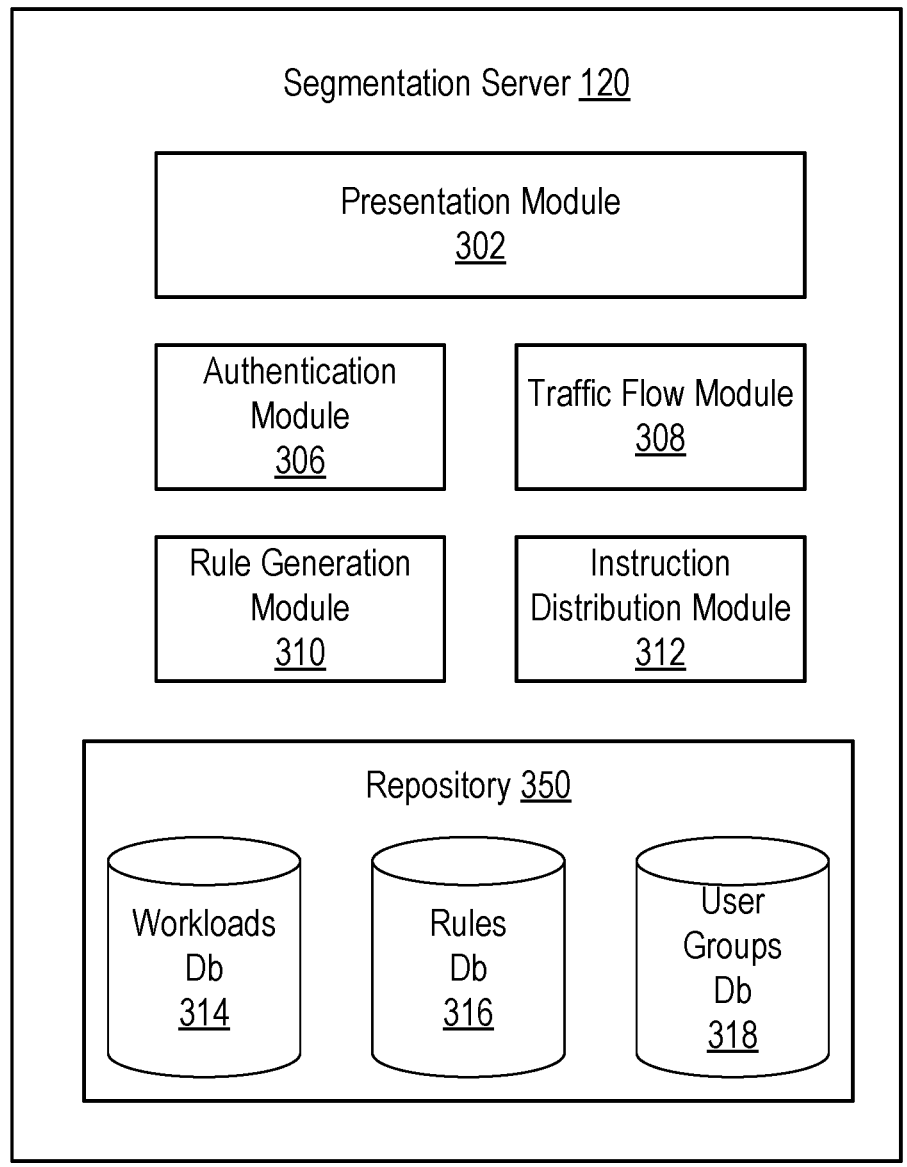
FIG. 3 is a block diagram illustrating an example embodiment of a segmentation server.

FIG. 3 is a high-level block diagram of an embodiment of a segmentation server 120. The segmentation server 120 comprises a presentation module 302, an authentication module 306, a traffic flow module 308, a rule generation module 310, an instruction distribution module 312, and a repository 350 including a workloads database 314, a rules database 316, and a user groups database 318. In alternative embodiments, the segmentation server 120 may include different or additional components. The various components of the segmentation server 120 may be implemented as one or more processors and a non-transitory computer-readable storage medium that stores instructions executed by the one or more processors to carry out the functions attributed to the segmentation server 120 described herein.

The traffic flow module 308 monitors traffic between workloads 138 and presents information relating to the traffic flows. For example, the traffic flow module 308 may identify each pair of workloads 138 that communicates with each other during a particular time period. For each detected traffic flow between a pair of workloads 138, the traffic flow module 308 may identify what services are communicated between the pair of workloads, what sub-components of the respective workloads (e.g., specific applications) 138 utilize those services, what ports are used by the respective workloads for the communications, and what protocols are used for the communications. Furthermore, the traffic flow module 308 may identify statistical information relating to the traffic flow between a pair of workloads 138 such as, for example, a volume of data transferred between the pair of workloads within a particular time period, a frequency of communications between the pair of workloads 138, a duration of communications between the pair of workloads 138, or other statistical information indicative of the extent of the communications.

The traffic flow module 308 may generate a representation of the traffic flows in the form of a traffic flow graph in which each workload 138 is represented by a node and a traffic flow between a pair of workloads 138 is represented by an edge connecting the respective nodes corresponding to the pair of workloads 138. The nodes may store information relating to the workloads 138 and the edges may store information relating to the traffic flow. In an embodiment, the traffic flow graph may be limited to traffic flows meeting predefined criteria. For example, the traffic flow graph may be limited to traffic flows meeting a predefined threshold volume of the traffic (e.g., amount of data, frequency, duration, or a combination thereof). Thus, pairs of workloads having only very limited or sporadic communications may be omitted from the traffic flow graph.

The traffic flow module 308 may generate a traffic flow graph corresponding to a limited group of label sets and according to different configuration parameters. For example, in a limited traffic view configuration, the traffic flow graph may be limited to traffic flows between pairs of workloads 138 in which both workloads 138 in the pair have label sets within the scope of the limited group of label sets. In an expanded traffic view configuration, the traffic flow graph may include traffic flows between any pairs of workloads 138 in which the provider of the service has a label set within the scope of the limited group of label sets, without necessarily requiring that the user of the service has a label set within the scope of the limited group of label sets. Limiting the traffic flow graph based on label sets can beneficially simplify analysis of a particular segment of the network 110. For example, an administrator may obtain traffic flow information pertaining only to a particular geographic location, role, environment, line of business, application, or a combination thereof.

The rule generation module 310 automatically generates rules. The particular strategy for generating the rules may be based on configuration settings for the rule generation module 310. Under some configuration settings, the rules may be generated based at least in part on the observed traffic flow graph. Particularly, the rule generation module 310 generates a set of rules that permits the traffic flows in the traffic flow graph, without permitting other traffic flows unrelated to the observed traffic flow graph. For example, the rule generation module 310 identifies a traffic flow and identifies the service associated with the traffic flow, the workload 138 corresponding to the provider of the service, and the workload 138 corresponding to the consumer of the service. The rule generation module 310 then generates a rule, if it does not already exist, that permits providing of the service from the identified provider of the service to the identified consumer of the service. The rule may be constructed using the label sets of the identified provider and the identified consumer. For example, if the provider has a first label set A and the consumer has a second label set B, the rule may specify the first label set A in the provided-by portion and the second label set B in the used-by portion of the newly created rule. Rules may be similarly generated for each observed traffic flow in the traffic flow graph and may be stored to the rules database 316. Assuming that there are no abnormal or malicious communications in the administrative domain 150 in the observed traffic flow graph, the rule generation module 310 will therefore produce a set of rules that permits communications observed during normal operation of the workloads 138 in the administrative domain 150 without permitting abnormal communications that are potentially malicious. When the segmentation policy is enforced by the OS instances 130, the OS instances 130 will block such potentially malicious communications that are not expressly permitted by the rules. Embodiments of processes for generating rules are further described in U.S. Pat. No. 9,485,279 issued on Nov. 1, 2016 to Paul J. Kirner, et al., which is incorporated by reference herein.

The rule generation module 310 may generate rules based on different segmentation strategies depending on configuration parameters. For example, under a high granularity segmentation strategy, the rule generation module 310 generates a set of rules that only permits communications relating to the particular services that are observed between pairs of workloads 138 and which are limited to the specific ports and protocols observed in the traffic flows. Thus, for example, if the traffic flow module 308 only observes communications between a particular pair of workloads 138 using port X (corresponding to a particular service) and a protocol Y, a rule will be generated that permits communications between the particular pair of workloads 138 only if it uses the ports X and the protocol Y. Thus, absent other separately generated rules, communications between the pair of workloads 138 not conforming to the specified ports and protocols, will be blocked. In an embodiment, the generated rule may be specified in accordance with respective label sets of the pair of workloads along a predefined set of dimensions (e.g., the dimensions defining a tier). As a result, the rule will also permit communications conforming to the specified ports and protocols between different pairs of workloads that conform to the same respective label sets along the same predefined set of dimensions (e.g., the same respective tiers) as the observed pair of workloads. For example, a rule may be generated that permits workloads 138 in a first tier associated with the label set "App: Point of Sale; Environment: PCI; Role: Database" to provide a service on port 5432 using TCP protocol to workloads 138 in a second tier associated with the label set "App: Point of Sale: Environment: PCI; Role: Processing."

In a moderate granularity segmentation strategy, the rule generation module 310 identifies the respective label sets along a predefined set of dimensions (e.g., the dimensions associated with a tier) associated with connected workload pairs observed in the traffic flow graph and generates a set of rules that permits communications between all pairs of workloads 138 having the respective label sets along the predefined set of dimensions (e.g., the same respective tiers), without regard to the specific ports or protocols observed. Thus, for example, if a connection is observed between a workload 138 having a label set X along the predefined set of dimensions and a workload 138 having a label set Y along the predefined set of dimensions, a rule is generated to permit communications between all workloads 138 having the label set X along the predefined set of dimensions and all workloads 138 having the label set Y along the predefined set of dimensions. For example, a rule may be generated that permits workloads 138 in a first tier associated with the label set "App: Point of Sale; Environment: PCI; Role: Database" to provide any service (using any port and any protocol) to workloads 138 in a second tier associated with the label set "App: Point of Sale: Environment: PCI; Role: Processing." Upon enforcement of the segmentation policy, communications between pairs of workloads that are not expressly permitted by the rules will be blocked.

Under other configuration settings, the rule generation module 310 may generate rules based on the label sets of workloads 138 independently of the observed traffic flows. For example, in a low granularity segmentation strategy, the rule generation module 310 generates a set of rules that permits communications between all workloads 135 that share a set of labels along a predefined set of dimensions without regard to observed communications. For example, the rule generation module 310 may generate rules that permit communications between all workloads 138 within the same application group (i.e., having at least the same application and environment labels). For example, a rule may be generated that permits workloads 138 in an application group associated with the label set "App: Point of Sale; Environment: PCI" to provide any service (using any port and any protocol) to other workloads 138 in the application group. Upon enforcement of the segmentation policy, communications between pairs of workloads that are not expressly permitted by the rules will be blocked.

In another embodiment, configuration settings may cause the rule generation module 310 to generate additional rules permitting communications between groups of workloads 138 having label sets meeting other specified criteria. For example, an administrator may specify configuration settings that enable the rule generation module 310 to generate rules permitting communications between a first application group X and a second application group Y.

In an embodiment, rules may be generated differently for different groups of workloads 138 by specifying different configuration settings for different groups. For example, rules may be generated for workloads 138 in a first application group according to a moderate level of granularity while rules may be generated for workloads 138 in a second application group according to a high level of granularity.

Furthermore, rules controlling communications between different groups of workloads 138 may be generated according to different configuration settings. For example, rules controlling communications between workloads 138 in a first application group and workloads 138 in a second application group may be generated according to a moderate level of granularity while rules controlling communications between workloads 138 in a first application group and workloads 138 in a third application group may be generated according to a low level of granularity.

The rule generation module 310 may be configured to generate rules that only affect workloads 138 associated within a scope of a limited group of label sets. Different rule generation schemes based on label sets may be configured. For example, in a limited rule generation configuration, the rule generation module 310 only generates rules in which both the label set associated with the provider of the service and the label set associated with the consumer of the service are within the scope of the limited group of label sets. In an expanded rule generation configuration, the rule generation module 310 may instead generate rules in which the provider the service has a label set within the scope of the limited group of label sets, without necessarily requiring that the user of the service also has a label set within the scope of the limited group of label sets. Thus, under the expanded rule set generation configuration, rules may permit providing of a service by a workload 138 having a label set within the scope of the limited group of label sets to a workload 138 with a label set outside the scope of the limited group of label sets. Limiting the generated rules based on label sets beneficially enables rule generation that is limited to a particular segment of the network 110. For example, the rule generation module 310 may operate to generate rules only for a portion of the workloads 138 associated with particular label values along certain label dimensions including geographic locations, roles, environments, lines of business, applications, or combinations thereof.

The presentation module 302 interfaces with the administrative client 160 to present a user interface enabling an administrator to manage the administrative domain 150 or a portion thereof. For example, the presentation module 302 may enable an administrator to view a representation of the traffic flows generated by the traffic flow module 308 and generate or modify rules associated with the segmentation policy using the rule generation module 310. For example, the presentation module 302 may generate a graphical interface representing all or a portion of the traffic flow graph with the workloads 138 illustrated as nodes and the traffic flows illustrated as edges connecting relevant nodes. An administrator may select a particular node to view information about the corresponding workload 138 (e.g., an identifier for the workload, a label set for the workload, services provided by or consumed by the workload, etc.). An administrator may similarly select a particular edge on the graph to view information about the corresponding traffic flow such as, for example, services associated with the traffic flow, ports and protocols associated with the traffic flow, or statistical information associated with the traffic flow.

The presentation module 302 may furthermore enable an administrator to execute the rule generation module 310 to generate a recommended rule set. The presentation module 302 may generate a presentation that enables the administrator to view the rules, modify the rules, or control whether a rule is activated or de-activated. For example, an administrator may toggle a particular rule on or off to modify the segmentation policy, or the administrator may manually edit the label sets associated with different portions of the rule.

The presentation module 302 may furthermore present various configuration options that enable an administrator to control operation of the traffic flow module 308 and the rule generation module 310. For example, the presentation module 302 may present a control for controlling which label sets contribute to generating the traffic flow graph and whether to generate an expanded traffic flow graph (including any traffic flows where the provider of the service corresponds to the label set) or a limited traffic flow graph (including only traffic flows where both the consumer and the provider correspond to the label set). Furthermore, the presentation module 302 may present a control for specifying a segmentation strategy for operating the rule generation module 310 (e.g., a high granularity, moderate granularity, or low granularity segmentation strategy). Alternatively, the configuration options may be automatically configured based on the privileges associated with the user group of the administrator accessing the presentation module 302.

The presentation module 302, traffic flow module 308, and the rule generation module 310 may present different information or enable access to different controls dependent on the user group associated with an administrator accessing the presentation module 302. Each user group may be assigned one or more roles and one or more label sets. The one or more label sets assigned to a user group constrains what information associated with the traffic flow module 308 and the rule generation module 310 are available to the user group. For example, when viewing traffic flow information, a member of a particular user group may have access only to traffic flow information associated with traffic flows involving workloads 138 within the scope of the one or more label sets assigned to the user group. Similarly, when generating, viewing, or modifying rules, a member of a particular user group may have access only to rules that specify a label set within the scope of at least one of the one or more label sets assigned to the user group. Different user groups may be given broader or narrower access to viewing traffic flows and managing rules depending on the one or more label sets assigned to the user group. For example, by associating a user group with a label set in only a single dimension (e.g., Location: New York), the user group will have broad access to viewing traffic flows and managing rules associated with all workloads 138 having a matching label in that dimension (e.g., all workloads 138 in New York) regardless of the labels in other dimensions. Alternatively, by associating a user group with a label set that spans multiple dimensions (e.g., Location: New York; Environment: Production: Role: Web), the user group will have narrower access to viewing traffic flows and managing rules associated with a smaller number of workloads 138 that have matching labels across all the specified dimensions. A user group may be associated with multiple label sets, thus allowing access to viewing traffic flows and managing rules associated with workloads 138 associated with any one of the associated label sets. For example, a user group associated with a first label set "Location: New York; Role: Web" and a second label set "Location: San Francisco; Role: Web" may give the user group access to all "web" workloads in both San Francisco and New York. In some cases, a user group may be associated with all possible label sets.

The role assigned to a user group dictates which specific privileges are available to user groups having that role. For example, administrators in one user group may have broad privileges to view information and control various parameters associated with viewing traffic flows and controlling rules, while administrators in another user group may have very limited privileges that may enable the administrator to access only a limited set of features. The role may furthermore dictate how the traffic flow module 308 and rule generation module 310 are respectively configured, or may limit which configurations the administrator may choose between. For example, one user group may only be able to view traffic flows and generate rules associated with a limited traffic view configuration (including only traffic flows where both the consumer and the provider are within the scope of the limited group of label sets associated with the user group), while another user group may be allowed to view traffic flows or generate rules associated with an expanded traffic view configuration (including any traffic flows where the provider of the service is within the scope of the limited group of label sets associated with the user group).

Examples of possible roles may include, for example, a "super user," a "manager," and a "provisioner." A super user role provides special high-level privileges. For example, a super user may access functions on the presentation module 302 to create new labels and assign labels to workloads 138. The associations between workloads and labels are stored in the workloads database 314. A super user may additionally assign roles and label sets to other user groups. The associations between user groups and their respective roles and label sets are stored in the user group database 318. A super user also generally has wide privileges to view traffic flows and generate or modify rules associated with any label sets. Furthermore, a super user can cause the segmentation server 120 to generate management instructions for a set of rules and distribute them to the OS instances 130.

A manager role generally provides fewer privileges than the super user role. A manager is generally assigned to one or more specific label sets that limits which traffic flows the manager has visibility into and accordingly limits the manager to generating rules related to the limited traffic flows. Unlike a super user, a manager can generally not modify the roles or label sets assigned to different user groups. In an embodiment, a manager may have the ability to create rules as a recommendation, but does not have privileges associated with causing the segmentation server 120 to generate and distribute the associated management instructions to the OS instances 130 enforce the rules.

A provisioner role may be a specialized role for reviewing and approving rules to cause the segmentation server 120 to generate and distribute the management instructions to the OS instances 130. The visibility of a provisioner may be limited to a particular group of label sets or may be unlimited. For example, in one embodiment, the provisioner can review rules generated by a plurality of different managers for different segments, optionally modify the rules, and cause the segmentation server 120 to generate and distribute the management instructions embodying the rules. The division of responsibility between the managers and provisioners beneficially enforces a check on the rules so that at least two administrators (a manager and a provisioner) have to approve the rules before they are enforced.

The authentication module 306 identifies a user group associated with an administrator accessing the segmentation server 120 via the administrative client 160, and authenticates the identity of the administrator. The authentication module 306 furthermore determines the role and label set associated with the user group so that the segmentation server 120 may restrict what information the administrator can access in the segmentation server 120 or what configuration changes the administrator can make. For example, in one embodiment, a role-based access control (RBAC) system may be used to control permissions associated with different user groups.

The instruction distribution module 312 generates the management instructions from the rules and distributes the relevant management instructions to the OS instances 130 as described above. In an embodiment, the instruction distribution module 312 generates and distributes the relevant management instructions to the OS instances 130 upon approval from an administrator having a provisioner role. Alternatively, the instruction distribution module 312 may automatically distribute the instructions upon being generated by the rule generation module 310 without necessarily requiring an additional approval.

Figure 4:
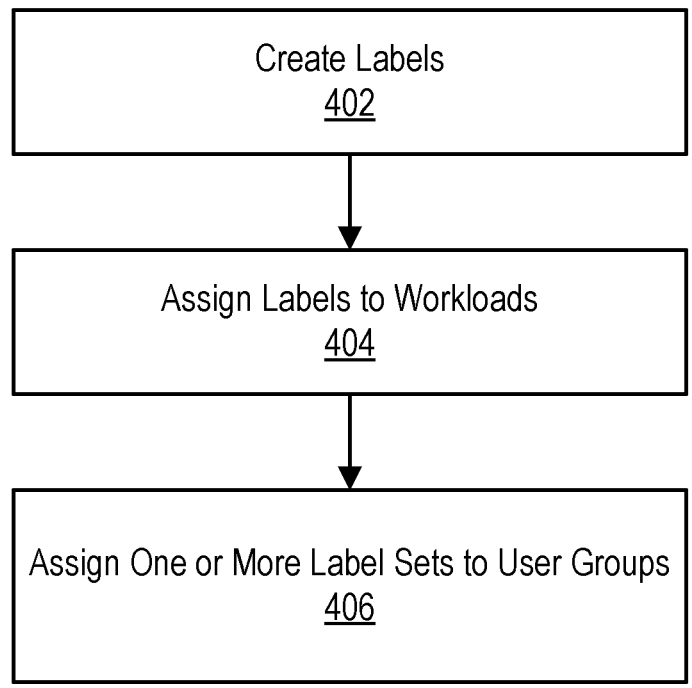
FIG. 4 is a flowchart illustrating an example process for managing user groups assigned to administer a segmentation policy.

FIG. 4 is a flowchart illustrating an example embodiment of a process for managing user groups controlling a segmentation policy. The process of FIG. 4 may be executed when a super user accesses the segmentation server 120 via the administrative client 160. Based on inputs received from the administrative client 160, the segmentation server 120 creates 402 labels that are assignable to workloads 138 within the administrative domain 150. Based on inputs received from the administrative client 160, the segmentation server 120 then assigns 404 labels to workloads 404. The assignments may be stored to the workload database 314. Based on inputs received from the administrative client 160, the segmentation server 120 assigns 406 one or more label sets to user groups. The assignments may be stored to the user groups database 318. For example, a first user group may be assigned to a first label set (e.g., "Location: San Francisco, Role: Web") while a second user group be assigned to a second label set (e.g., "Location: New York, Role: Database.") Then, the members of the first user group may view traffic flows and/or generate rules within the scope of the first label set, while members of the second user group may view traffic flows and/or generate rules within the scope of the second label set. Assignments of labels to workloads 138 and assignments of label sets to user groups may be performed in either order or in parallel.

Figure 5:
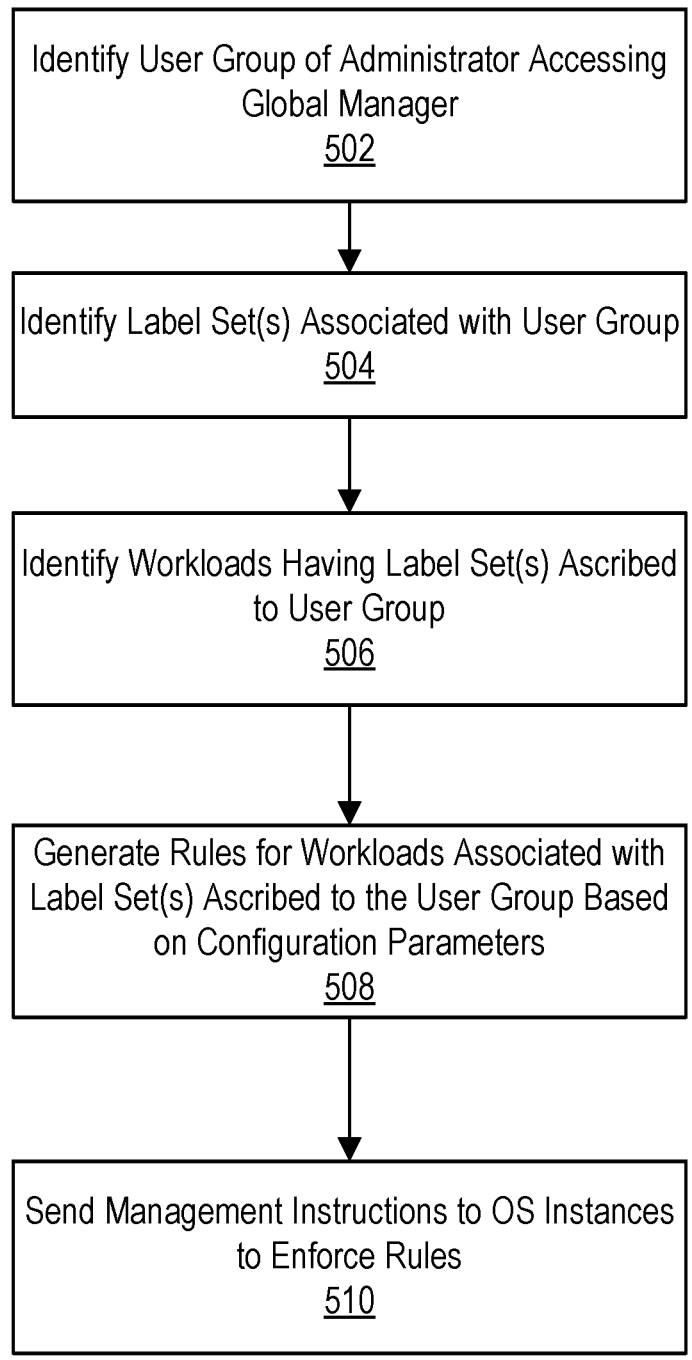
FIG. 5 is a flowchart illustrating an example process for generating rules for a segmentation policy.

FIG. 5 is a flowchart illustrating an embodiment of a process for managing a portion of a segmentation policy based on a user group. The segmentation server 120 identifies 502 the user group associated with an administrator accessing the segmentation server 120. The segmentation server 120 identifies 504 one or more label sets associated with the user group. For example, the segmentation server 120 may perform a lookup in the user group database 318 to identify the one or more label sets associated with the user group. The segmentation server 120 identifies 506 workloads 138 with a label set ascribed to the user group. For example, the segmentation server 120 performs a lookup in the workloads database 314 to determine which workloads 138 have a label set within the scope of one of the label sets associated with the user group. The segmentation server 120 generates 508 rules applicable to the workloads 138 associated with the one or more label sets ascribed to the user group in accordance with one or more configuration parameters. The segmentation server 120 may generate the rules differently dependent on the segmentation strategy specified in the configuration parameters (e.g., high granularity, moderate granularity, or low granularity segmentation strategy) as described above. For example, under one configuration, the segmentation server 120 monitors traffic flows associated with the identified workloads, and for each monitored traffic flow, the segmentation server 120 generates a rule (if it does not already exist) that permits traffic flow between an observed provider of a service and an observed consumer of the service. Under another configuration, the rule generation module 310 may generate rules based only on the labels of the workloads 138 independently of the observed traffic flows. The segmentation server 120 then sends 510 management instructions to OS instances 130 to enforce the generated rules.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for facilitating creation of a segmentation policy controlling communications between a plurality of workloads, the method comprising:
   identifying a user group associated with an administrator logged into an administrative client accessing a segmentation server;
   identifying, from a user group database, a group of label sets associated with the user group;

identifying, from a workload database, a subset of workloads of the plurality of workloads relevant to the user group, the subset of workloads having at least one of the group of label sets associated with the user group;

determining whether the user group has limited ruleset creation privileges or expanded ruleset creation privileges;

responsive to determining that the user group has limited ruleset creation privileges, configuring a user interface of the administrative client with a first configuration in which the administrator can only control rules of the segmentation policy that permit connections between pairs of workloads that are both in the subset of workloads relevant to the user group;

responsive to determining that the user group has expanded ruleset creation privileges, configuring the user interface of the administrative client with a second configuration in which the administrator can only control rules of the segmentation policy that permit connections between pairs of workloads in which a provider workload providing a service is within the subset of workloads relevant to the user group;

receiving the configuration from the administrative client;

generating management instructions for enforcing the set of rules; and sending the management instructions to respective enforcement modules associated with the subset of workloads, wherein the respective enforcement modules configure traffic filter to enforce the set of rules based on the management instructions.

2. The method of claim 1, further comprising:

monitoring traffic flows associated with the subset of workloads;

generating a traffic flow graph based on the monitored traffic flows, the traffic flow graph comprising a plurality of nodes representing the subset of workloads, and a plurality of edges representing the monitored traffic flows between the subset of workloads;

generating a graphical representation of the traffic flow graph; and outputting the graphical representation of the traffic flow graph to the administrative client.

3. The method of claim 1, wherein generating the management instructions comprises:

generating a rule permitting any communications between workloads having a same predefined label set.

4. The method of claim 1, wherein generating the management instructions comprises:

monitoring traffic flows associated with the subset of workloads; and generating the set of rules based on the monitored traffic flows, the set of rules permitting the monitored traffic flows.

5. The method of claim 4, wherein generating the management instructions comprises:

detecting traffic flow between a first workload in the subset of workloads and a second workload in the plurality of workloads;

determining a first label set associated with the first workload and a second label set associated with the second workload; and generating a rule permitting communications between workloads having the first label set and workloads having the second label set.

6. The method of claim 4, wherein generating the management instructions comprises:

detecting traffic flow between a first workload in the subset of workloads and a second workload in the plurality of workloads;

detecting one or more ports and one or more protocols over which the traffic flow is communicated;

determining a first label set associated with the first workload and a second label set associated with the second workload; and generating a rule permitting communications using the one or more ports and the one or more protocols between workloads having the first label set and workloads having the second label set.

7. The method of claim 1, wherein generating the management instructions comprises:

storing the rules to a rules database;

identifying access of the segmentation server by a provisioner associated with a provisioner user group;

generating a provisioner user interface presenting the rules for review; and generating the management instructions responsive to receiving confirmation from the provisioner via the provisioner user interface to implement the rules.

8. A non-transitory computer-readable storage medium storing instructions executable by one or more processors for facilitating creation of a segmentation policy, the instructions when executed causing the one or more processors to perform steps including:

identifying a user group associated with an administrator logged into an administrative client accessing a segmentation server;

identifying, from a user group database, a group of label sets associated with the user group;

identifying, from a workload database, a subset of workloads of the plurality of workloads relevant to the user group, the subset of workloads having at least one of the group of label sets associated with the user group;

determining whether the user group has limited ruleset creation privileges or expanded ruleset creation privileges;

responsive to determining that the user group has limited ruleset creation privileges, configuring a user interface of the administrative client with a first configuration in which the administrator can only control rules of the segmentation policy that permit connections between pairs of workloads that are both in the subset of workloads relevant to the user group;

responsive to determining that the user group has expanded ruleset creation privileges, configuring the user interface of the administrative client with a second configuration in which the administrator can only control rules of the segmentation policy that permit connections between pairs of workloads in which a provider workload providing a service is within the subset of workloads relevant to the user group;

receiving the configuration from the administrative client;

generating management instructions for enforcing the set of rules; and sending the management instructions to respective enforcement modules associated with the subset of workloads, wherein the respective enforcement modules configure traffic filter to enforce the set of rules based on the management instructions.

9. The non-transitory computer-readable storage medium of claim 8, wherein the instructions when executed further cause the processor to perform steps including:

monitoring traffic flows associated with the subset of workloads;

generating a traffic flow graph based on the monitored traffic flows, the traffic flow graph comprising a plurality of nodes representing the subset of workloads, and a plurality of edges representing the monitored traffic flows between the subset of workloads;

generating a graphical representation of the traffic flow graph; and outputting the graphical representation of the traffic flow graph to the administrative client.

10. The non-transitory computer-readable storage medium of claim 8, wherein generating the management instructions comprises:

generating a rule permitting any communications between workloads having a same predefined label set.

11. The non-transitory computer-readable storage medium of claim 8, wherein generating the management instructions comprises:

monitoring traffic flows associated with the subset of workloads; and generating the set of rules based on the monitored traffic flows, the set of rules permitting the monitored traffic flows.

12. The non-transitory computer-readable storage medium of claim 11, wherein generating the management instructions comprises:

detecting traffic flow between a first workload in the subset of workloads and a second workload in the plurality of workloads;

determining a first label set associated with the first workload and a second label set associated with the second workload; and generating a rule permitting communications between workloads having the first label set and workloads having the second label set.

13. The non-transitory computer-readable storage medium of claim 11, wherein generating the management instructions comprises:

detecting traffic flow between a first workload in the subset of workloads and a second workload in the plurality of workloads;

detecting one or more ports and one or more protocols over which the traffic flow is communicated;

determining a first label set associated with the first workload and a second label set associated with the second workload; and generating a rule permitting communications using the one or more ports and the one or more protocols between workloads having the first label set and workloads having the second label set.

14. A system for facilitating creation of a segmentation policy, the system comprising:

one or more processors; and a non-transitory computer-readable storage medium storing instructions executable by the one or more processors, the instructions when executed causing the one or more processor to perform steps including:

identifying a user group associated with an administrator logged into an administrative client accessing a segmentation server;

identifying, from a user group database, a group of label sets associated with the user group;

identifying, from a workload database, a subset of workloads of the plurality of workloads relevant to the user group, the subset of workloads having at least one of the group of label sets associated with the user group;

determining whether the user group has limited ruleset creation privileges or expanded ruleset creation privileges;

responsive to determining that the user group has limited ruleset creation privileges, configuring a user interface of the administrative client with a first configuration in which the administrator can only control rules of the segmentation policy that permit connections between pairs of workloads that are both in the subset of workloads relevant to the user group;

responsive to determining that the user group has expanded ruleset creation privileges, configuring the user interface of the administrative client with a second configuration in which the administrator can only control rules of the segmentation policy that permit connections between pairs of workloads in which a provider workload providing a service is within the subset of workloads relevant to the user group;

receiving the configuration from the administrative client;

generating management instructions for enforcing the set of rules; and sending the management instructions to respective enforcement modules associated with the subset of workloads, wherein the respective enforcement modules configure traffic filter to enforce the set of rules based on the management instructions.

15. The system of claim 14, wherein the instructions when executed further cause the one or more processors to perform steps including:

monitoring traffic flows associated with the subset of workloads;

generating a traffic flow graph based on the monitored traffic flows, the traffic flow graph comprising a plurality of nodes representing the subset of workloads, and a plurality of edges representing the monitored traffic flows between the subset of workloads;

generating a graphical representation of the traffic flow graph; and outputting the graphical representation of the traffic flow graph to the administrative client.

16. The system of claim 14, wherein generating the management instructions comprises:

monitoring traffic flows associated with the subset of workloads; and generating the set of rules based on the monitored traffic flows, the set of rules permitting the monitored traffic flows.

17. The system of claim 14, wherein generating the management instructions comprises:

generating a rule permitting any communications between workloads having a same predefined label set.

18. The system of claim 14, wherein generating the management instructions comprises:

detecting traffic flow between a first workload in the subset of workloads and a second workload in the plurality of workloads;

determining a first label set associated with the first workload and a second label set associated with the second workload; and generating a rule permitting communications between workloads having the first label set and workloads having the second label set.

19. The system of claim 14, wherein generating the management instructions comprises:

detecting traffic flow between a first workload in the subset of workloads and a second workload in the plurality of workloads;

detecting one or more ports and one or more protocols over which the traffic flow is communicated;

determining a first label set associated with the first workload and a second label set associated with the second workload; and generating a rule permitting communications using the one or more ports and the one or more protocols between workloads having the first label set and workloads having the second label set.

20. The system of claim 14, wherein generating the management instructions comprises:

storing the rules to a rules database;

identifying access of the segmentation server by a provisioner associated with a provisioner user group;

generating a provisioner user interface presenting the rules for review; and generating the management instructions responsive to receiving confirmation from the provisioner via the provisioner user interface to implement the rules.

\* \* \* \* \*